(12) United States Patent
Vogler et al.

(10) Patent No.: US 7,966,766 B2
(45) Date of Patent: Jun. 28, 2011

(54) RAISED GARDEN BED KIT

(76) Inventors: Michael R. Vogler, Oswego, IL (US);
Michael Thuma, LaGrange, IL (US)

( * ) Notice: Subject to any disclaimer, the term of this patent is extended or adjusted under 35 U.S.C. 154(b) by 0 days.

(21) Appl. No.: 12/409,579

(22) Filed: Mar. 24, 2009

(65) Prior Publication Data

US 2010/0242357 A1    Sep. 30, 2010

(51) Int. Cl.
*A01G 9/20* (2006.01)
(52) U.S. Cl. ........................................ 47/19.1
(58) Field of Classification Search ........ 47/33; 52/271; 405/284
See application file for complete search history.

(56) References Cited

U.S. PATENT DOCUMENTS

| | | | |
|---|---|---|---|
| 2,794,375 A * | 6/1957 | Di Falco et al. ................... 404/7 |
| 3,389,499 A | 6/1968 | Haile |
| D248,289 S | 6/1978 | Opitz |
| 4,099,815 A * | 7/1978 | Cox et al. ................... 312/348.2 |
| 4,309,843 A | 1/1982 | Kato |
| D271,289 S | 11/1983 | Carlsson |
| 4,429,489 A | 2/1984 | Fischer |
| D273,667 S | 5/1984 | Vuarnesson et al. |
| 4,651,466 A | 3/1987 | Robinson |
| 4,739,580 A | 4/1988 | Simmons et al. |
| 4,751,792 A | 6/1988 | Robinson |
| 4,850,134 A | 7/1989 | Snekkenes |
| 4,869,018 A | 9/1989 | Scales et al. |
| D304,318 S | 10/1989 | Tervo et al. |
| 4,897,955 A | 2/1990 | Winsor |
| 4,924,623 A | 5/1990 | van Rens |
| 5,040,328 A | 8/1991 | Coon |
| 5,075,148 A | 12/1991 | Burcky et al. |
| D323,133 S | 1/1992 | Newmark |
| 5,168,678 A | 12/1992 | Scott, Jr. et al. |
| D337,925 S | 8/1993 | Scott, Jr. et al. |
| D338,140 S | 8/1993 | Scott, Jr. et al. |
| D338,377 S | 8/1993 | Scott, Jr. et al. |
| D340,169 S | 10/1993 | Scott, Jr. et al. |
| 5,259,154 A | 11/1993 | Lilley |
| 5,375,369 A * | 12/1994 | VerHoeve ........................ 47/33 |
| 5,400,544 A | 3/1995 | Wien |
| 5,542,787 A * | 8/1996 | Charlanow .................... 405/284 |
| 5,611,172 A | 3/1997 | Dugan et al. |
| D384,908 S | 10/1997 | Tuttle |
| 5,675,929 A | 10/1997 | Sontea et al. |
| 5,797,235 A * | 8/1998 | Bowerman et al. .......... 52/582.1 |
| 5,806,249 A | 9/1998 | Helms |
| 5,836,108 A | 11/1998 | Scheuer |
| D402,229 S | 12/1998 | Christensen |
| 5,852,895 A | 12/1998 | Sinanan |
| 5,901,526 A | 5/1999 | Vidmar et al. |
| 6,085,458 A | 7/2000 | Gau |
| 6,173,906 B1 | 1/2001 | Von Kerens |
| 6,336,290 B1 | 1/2002 | Callan |
| 6,389,742 B1 | 5/2002 | Wuster |
| 6,418,675 B1 | 7/2002 | Peggs et al. |
| D462,033 S | 8/2002 | Reichert |
| 6,434,882 B1 | 8/2002 | Becker |
| 6,532,707 B1 * | 3/2003 | Ian Cannon .................... 52/271 |

(Continued)

*Primary Examiner* — Francis T Palo (57) ABSTRACT

The instant invention provides a kit for assembly of a raised garden bed. The raised garden bed includes panel members, corner connector members, and linear connector members constructed of a polymeric material and adapted to be snapped together into a substantially rigid raised garden bed without the need for special tools or excessive strength. A tongue and groove arrangement is also provided to allow for panel member stacking for increased garden bed height. The components of the kit are constructed and arranged to be packed into a relatively small profile for shipping and transport and are generally light enough to be loaded and unloaded without the need for equipment such as a forklift or pallet jack.

2 Claims, 13 Drawing Sheets

U.S. PATENT DOCUMENTS

| | | |
|---|---|---|
| 6,622,423 B1 | 9/2003 | Riccardi |
| D502,425 S | 3/2005 | Barry |
| 6,938,369 B2 | 9/2005 | Zwier |
| 6,944,998 B1 | 9/2005 | King |
| 7,036,270 B1 | 5/2006 | Shepherd |
| 7,159,367 B1 | 1/2007 | King |
| D556,627 S | 12/2007 | Arev |
| D571,688 S | 6/2008 | White |
| 2001/0045056 A1 | 11/2001 | Hulett |
| 2003/0089031 A1 | 5/2003 | Wong et al. |
| 2005/0005511 A1 | 1/2005 | Sacks |
| 2005/0081437 A1 | 4/2005 | Heinemann |
| 2005/0160686 A1 | 7/2005 | Williams |
| 2007/0079547 A1 | 4/2007 | Gold |
| 2007/0089357 A1 | 4/2007 | Bowdish |
| 2008/0120905 A1 | 5/2008 | Pai |

* cited by examiner

RAISED GARDEN BED KIT

FIELD OF THE INVENTION

This invention relates generally to gardening and, more particularly, to a snap-together kit for creating a raised garden bed useful for containing soil and growing plants.

BACKGROUND OF THE INVENTION

The idea of growing plants in single file, "row crops" started when the horse and plow needed space between rows to cultivate crops in a large scale. Later, row spacings were widened to accommodate tractors and their implements. Out of habit, many home gardeners plant single file vegetable gardens in their backyards either for hobby or out of need to grow food for their family. However, row cropping has many disadvantages for the home gardener. A major disadvantage is the space required to raise such a garden. Many home owners only have a small amount of land to dedicate to growing a home garden, and therefore must limit the amount of crops that are grown. Another disadvantage relates to soil compaction. Plant roots need air. In an ordinary row crop garden, the gardener cannot avoid stepping between the rows to maintain the garden. This foot traffic on each side of a single row can severely compact the soil, thereby reducing the air that reaches the roots, impeding plant growth and reducing production. Thus, row crop gardening is not practical for many home owners.

Raised bed gardens have been in use for centuries. Permanent beds, raised a few inches above the soil level and arranged just wide enough to reach across by hand, are an ideal way to grow vegetables and small fruit. Several rows of vegetables can be grouped together in a bed with a walkway on either side. Raised bed gardens can range from a simple rectangular plateau of soil to a more elaborate bed paneled in wood or stone and mortar. Although, the permanent structures are more expensive and time consuming to build, permanent structures keep the soil in place during heavy rains and may provide an appealing appearance to the landscaping.

Raised bed gardens have several advantages over row crop gardens. For example, a properly designed raised bed garden allows most or all of the gardening to be accomplished from around the perimeter of the raised bed, minimizing or eliminating soil compaction. Plants can be spaced closer together in a raised bed because there is no need to step on or run equipment between the rows of plants. This increases productivity per square foot of bed and reduces weed growth when plants begin to mature. Raised beds tend to drain away excess moisture better than ordinary gardens. This is another advantage that helps the plant roots to breath. Soil conditions and types can be controlled more efficiently in a raised bed and they can be varied easily from bed to bed. Water, fertilizer, compost, mulch, etc. can be applied more carefully because they only need to be applied to the garden beds. Raised garden beds can extend the gardening season. They tend to warm up sooner in the spring and remain productive later into the fall. Raised garden beds are also convenient for the gardener. They reduce stooping and bending and many can be weeded from a stool or garden wagon with a seat board.

However, state of the art raised plant beds include their own set of drawbacks. Raised garden beds are often made from treated lumber, railroad ties, concrete blocks, rocks, or bricks. The chemicals used in treated lumber are toxic. Therefore, sawing or drilling the lumber to make the raised plant bed requires protective measures to avoid breathing in dust, etc. Non-treated woods are prone to rotting when in contact with soil. Creosote in the railroad ties is also toxic and the vapors may burn tender plants. In addition, soil expands and contracts when freezing and thawing. Wood can easily bow out, while the masonry is prone to cracking or breaking.

Thus what is needed in the art is a kit for assembling a raised garden bed. The components should be constructed of a polymeric material that is substantially impervious to moisture, thus resistant to rot. The material should be lightweight yet strong enough to withstand the weight of the soil it contains without bowing or bending. The components should be capable of snap-together assembly without undue strength or without the need for special tools. The components should also stack together into a small profile package that can be easily shipped and transported.

SUMMARY OF THE INVENTION

The instant invention provides a kit for assembly of a raised garden bed. The raised garden bed includes a plurality of components constructed of a polymeric material and adapted to be snapped together into a substantially rigid raised garden bed without the need for special tools or excessive strength. The components of the kit are constructed and arranged to be packed into a small profile for shipping and transport, and are substantially hollow so that they are light enough to be loaded and unloaded without the need for equipment such as a forklift or pallet jack.

The kit generally includes panel members, corner connector members, linear connector members, and spike members. The panel members are generally hollow and rectangular in shape when viewed from the end, having a top wall, bottom wall, and a pair of sidewalls. The top wall has an outwardly extending male tongue for cooperating with the bottom wall of another panel member having a female groove to allow panel member stacking. The sidewalls are substantially parallel and may include texture or wood grain on the outer surfaces thereof for aesthetic purposes. A plurality of ribs extend between the sidewalls for added strength and rigidity to reduce bowing and/or twisting of the panel members. Apertures are provided at about the distal ends of the sidewalls for interlocking cooperation with the corner connectors or linear connectors.

The linear connector members include a central rib having a number of locking posts extending outwardly from opposite sides thereof. An aperture extends through the central portion of the central rib for anchoring the connector to a ground surface. The locking posts are sized and shaped for insertion onto the distal ends of the panel members. Each locking post includes at least one snap lock for interlocking cooperation with the apertures positioned in the sidewalls at the distal ends of the panel members.

The corner connectors include a vertical rib having a number of locking posts extending outwardly from adjacent surfaces thereof so that the locking posts are positioned at substantially right angles with respect to each other. An aperture extends through the central portion of the central rib for anchoring the connector to a ground surface. The locking posts are sized and shaped for insertion onto the distal ends of the panel members. Each locking post includes at least one snap lock for interlocking cooperation with the apertures positioned at the distal ends of the sidewall members.

The components may be supplied in a kit form intended to be assembled into a predetermined shape or alternatively, a user may choose a combination of panel members, linear connectors and corner connectors for assembly into a garden bed of virtually any desired shape and/or size.

Accordingly, it is an objective of the present invention to provide a raised garden bed kit utilizing snap-fit connections between panel members and connectors to assemble a raised garden bed.

It is another objective of the present invention to provide a raised garden bed kit which is easy to assemble and does not require typical fasteners to secure the components together into a raised garden bed assembly.

It is yet another objective of the present invention to provide a raised garden bed kit comprised of polymeric components that are lightweight and resist rotting.

It is still yet another objective of the present invention to provide a raised garden bed kit that provides for panel member stacking by utilizing an integrally formed tongue and groove design between stacked panel members.

It is a further objective of the present invention to provide a raised garden bed kit having connectors constructed and arranged to cooperate with stakes to prevent bowing from the force the soil exerts on the panel members.

It is yet a further objective of the present invention to provide a raised garden bed kit constructed of polymeric components so as to be substantially hollow to reduce material consumption and reduce shipping costs.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Referring now to FIGS. 1-15, a raised garden bed and kit 100 are illustrated. The raised garden bed kit includes a plurality of panel members 102, a plurality of corner connectors 104, a plurality of linear connectors 106, and a plurality of stakes 108. In an assembled form, the raised garden bed kit 100 is supported by a ground surface 110. The plurality of panel members 102 and plurality of connectors 104, 106 define a raised garden bed 100 for containing suitable planting soil and growing plants therein.

Figure 1:
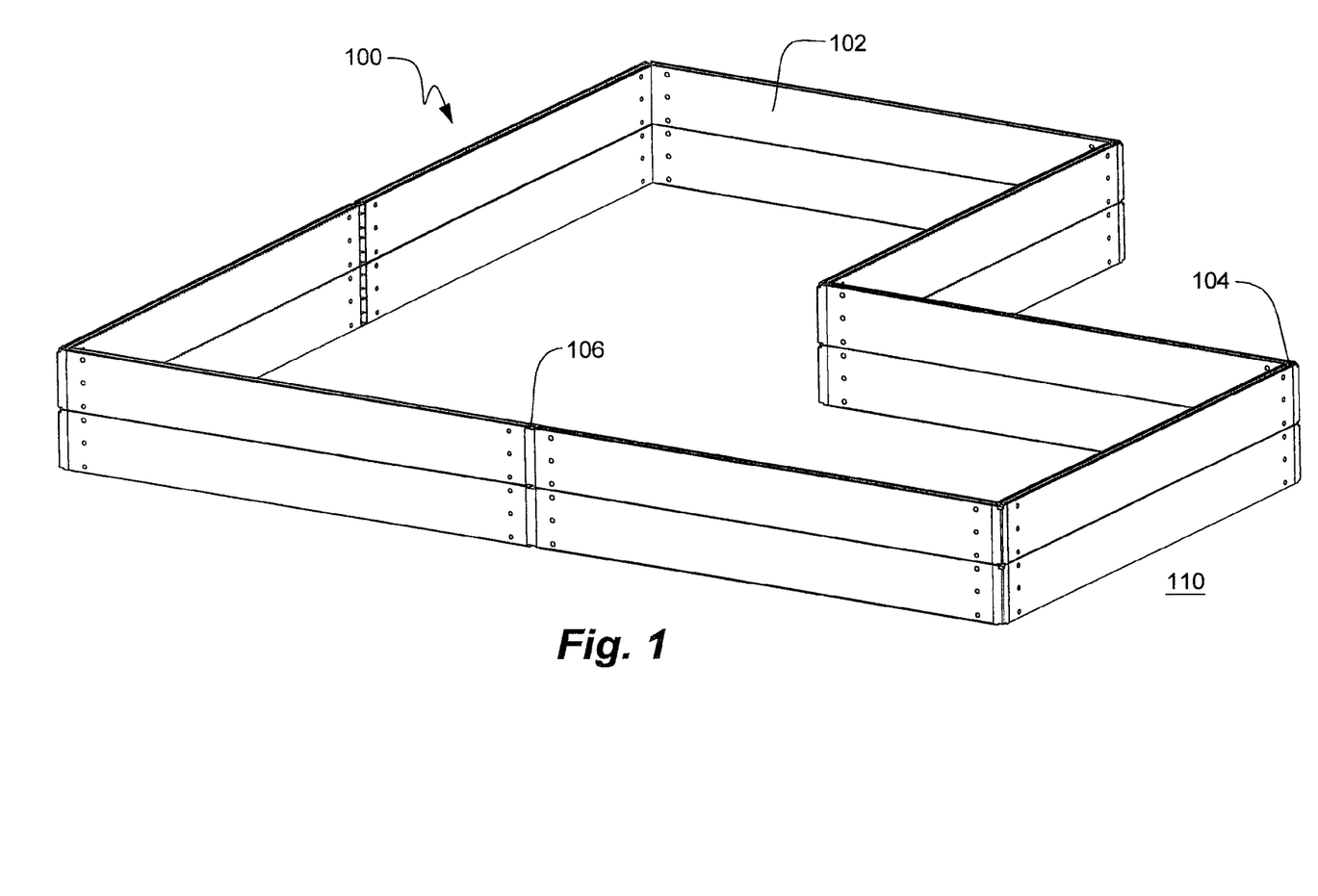
FIG. 1 is a top perspective view of one embodiment of an assembled raised garden bed as constructed by the teachings of the present invention.
Figure 2:
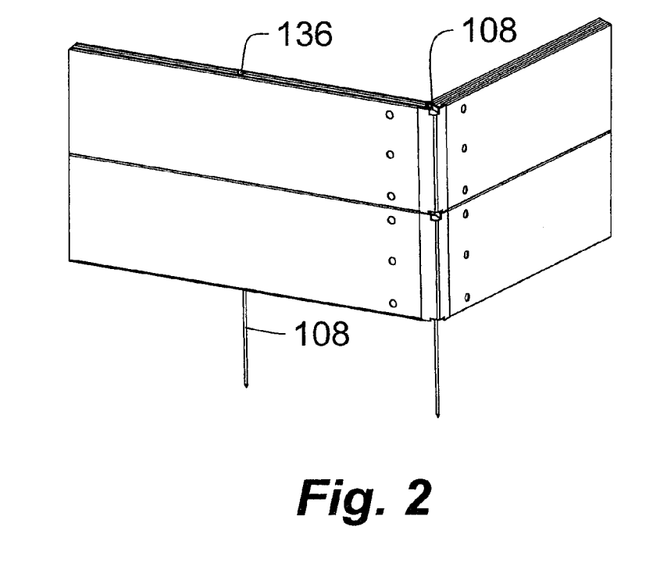
FIG. 2 is a partial perspective view of the assembled raised plant bed of FIG. 1, illustrating a stacked corner arrangement.
Figure 3:
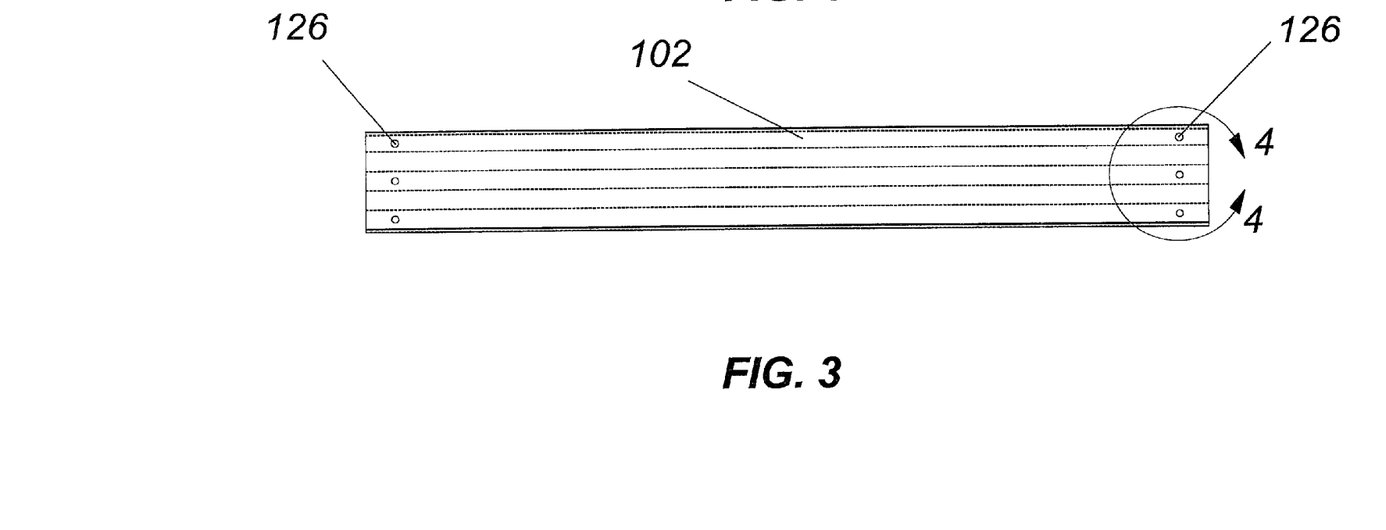
FIG. 3 is a side view of one embodiment of a panel member.
Figure 4:
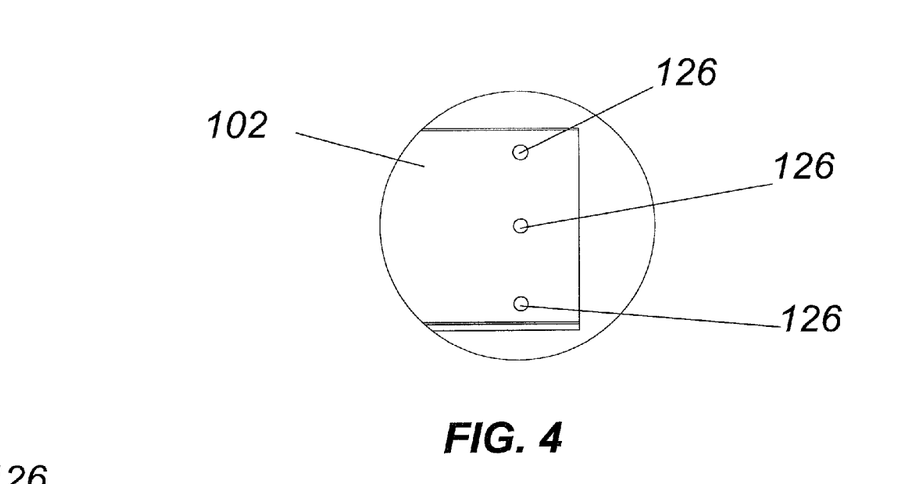
FIG. 4 is a partial side view taken along lines 4-4 of FIG. 3.
Figure 5:
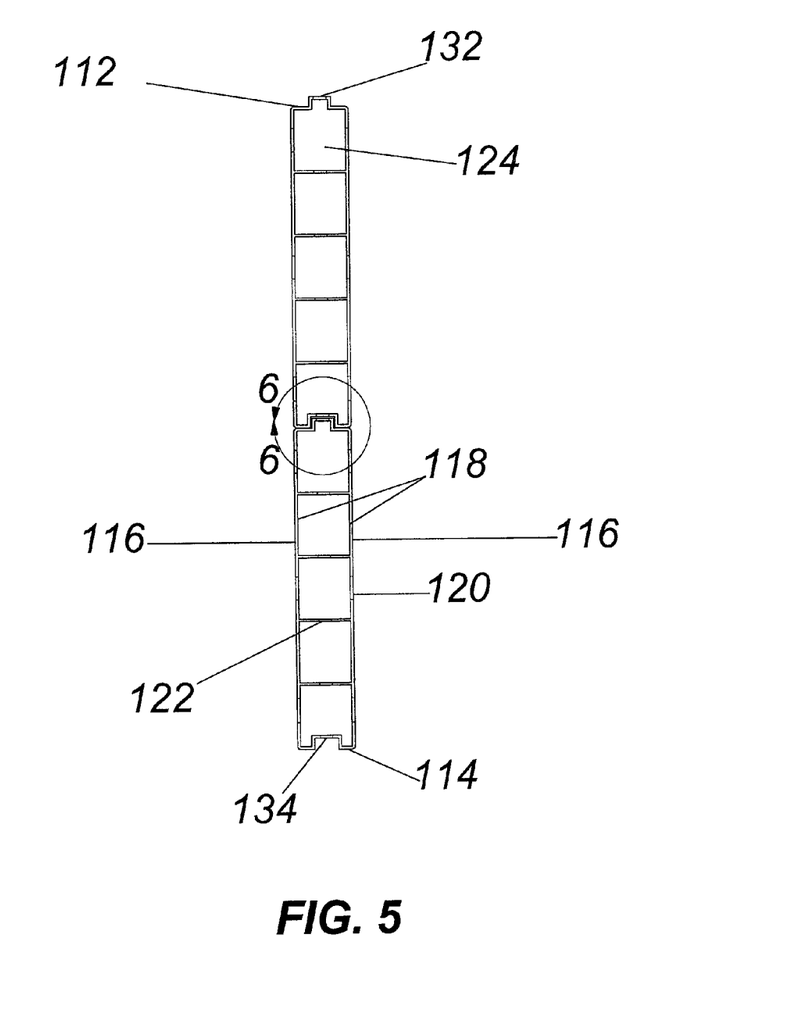
FIG. 5 is an end view of a pair of panel members arranged in a stacked configuration.
Figure 6:
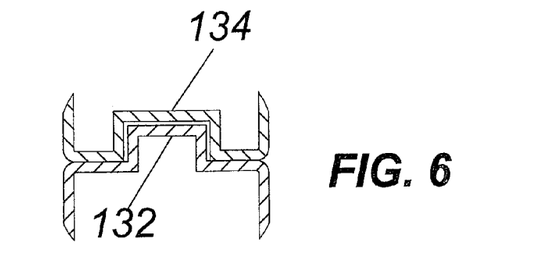
FIG. 6 is a partial end view taken along lines 6-6 of FIG. 5.
Figure 7:
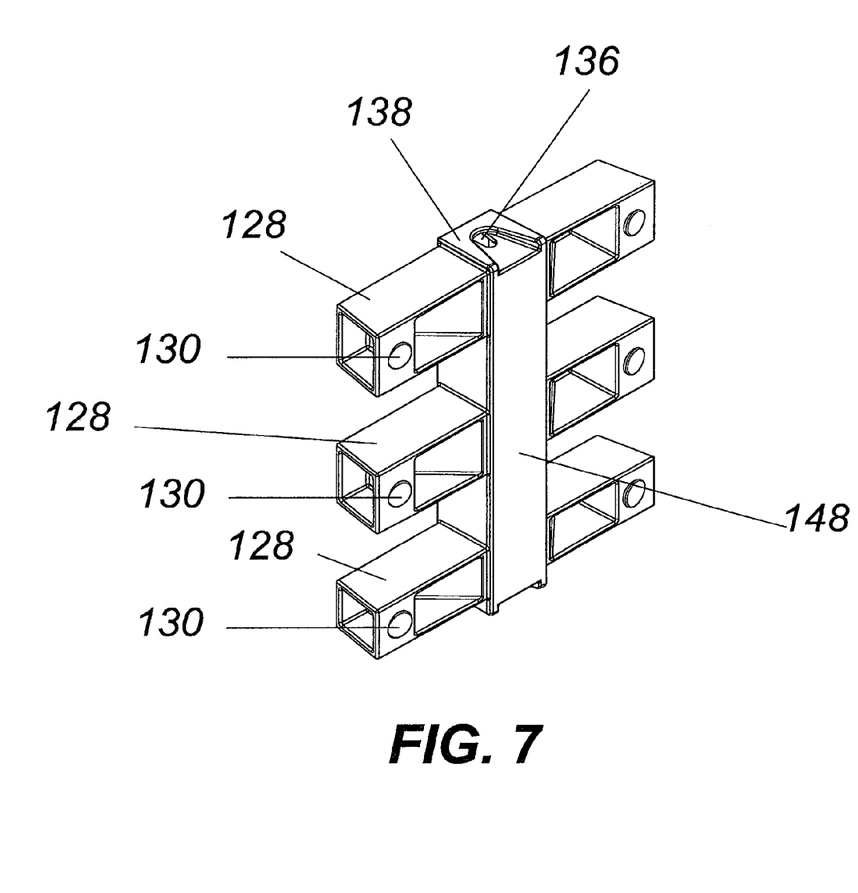
FIG. 7 is a front perspective view of one embodiment of a linear connector of the present invention.
Figure 8:
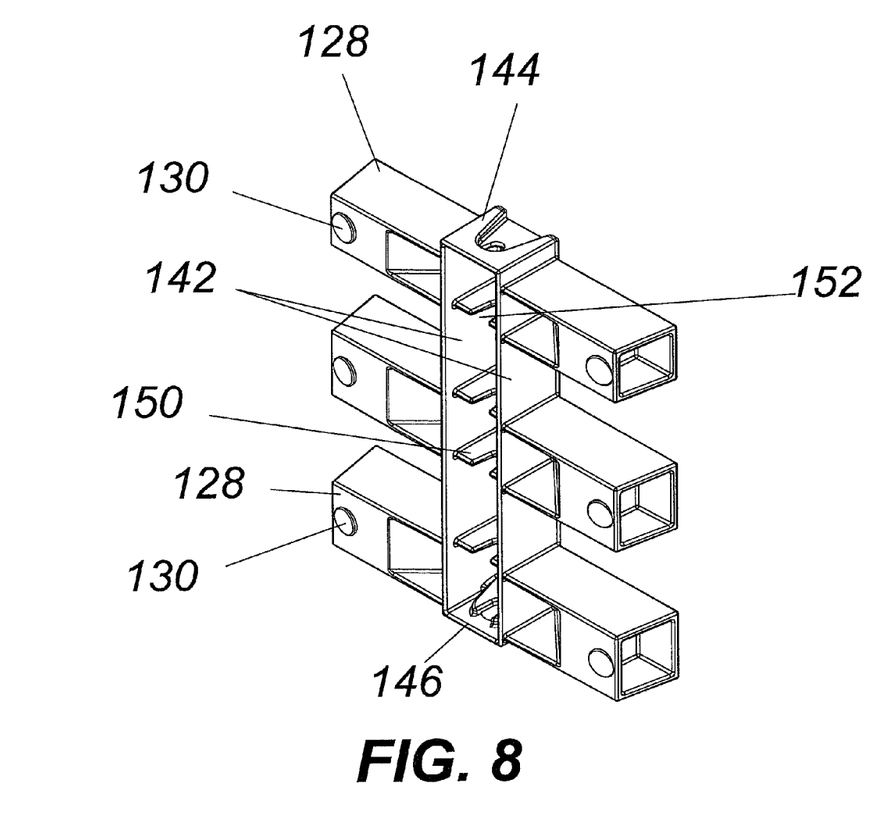
FIG. 8 is a rear perspective view of the linear connector illustrated in FIG. 7.

Referring to FIGS. 1-6, the panel members 102 are horizontally connected together at a predetermined distance predicated by the length of the panel members and subsequent connection to linear or corner connectors 104, 106 respectively. The connectors and panel members are attached together using a snap-fit connection that is completed without the need for tools. The panel members 102 may also be stacked atop of one another using a tongue and groove design on each panel member, as illustrated in FIGS. 5 and 6, allowing for a raised garden bed having an increased height or various numbers of panel member levels. The construction of the connectors 104, 106 also provides for interlocking stacking. The overlapping configuration of the tongue and groove arrangement and the stacked connectors provides a sufficient connection to maintain the contents within the garden bed and provide a stable connection between the components.

Referring to FIGS. 3-6, a preferred embodiment of a panel member is illustrated. The panel members are preferably extruded or long core injection molded from a polymeric material to be substantially hollow. Each panel member preferably includes a top wall 112, a bottom wall 114, and parallel sidewalls 116. Each sidewall defines an interior surface 118 and an exterior surface 120, and a plurality of cross braces 122 extend between the interior surfaces 118 to provide strength and rigidity to the panel members as well as define generally rectangular shaped sockets 124 for accepting locking posts 128 (FIG. 7) for connection to the connectors 104, 106. Apertures 126 are also provided at about the distal ends of the panel members for cooperation with snap-locks 130 (FIG. 7) positioned on the locking posts to prevent undesired disassembly of the components. The top wall 112 of each panel member preferably includes an outwardly extending tongue 132 along the length of the panel member while the bottom wall is provided with a groove 134. The tongue is preferably sized and shaped to cooperate with the groove to allow stacking of the panel members as illustrated in FIGS. 5 and 6. The panel members may be provided in any suitable length and may be constructed and arranged to be cut for custom applications. Transverse apertures 136 (FIG. 2) may also be provided. The transverse apertures are sized to accept stakes 108 to add additional rigidity and prevent bowing of an assembled raised plant bed.

Referring to FIGS. 7-8 and 13-15, one embodiment of a linear connector is illustrated. The linear connector generally includes a column portion 138 having about the same thickness and height of the panel members 102. The column includes parallel sidewalls 142, a top wall 144, a bottom wall 146, and an exterior wall 148. A plurality of ribs 150 extend across the interior of the parallel sidewalls 142. Each rib includes a U-shaped notch 152 sized to accept and guide a stake member 108. Extending outwardly from opposite sides of the center post 138 and coaxially aligned are a plurality of locking posts 128. The locking posts are generally rectangular in shape and sized to slip into locking sockets 124 (FIG. 5) until snap-locks 130 engage apertures 126 in the side walls of the panel members to complete the connection (FIGS. 13-16). The snap-locks 130 are preferably provided on two opposing sides of the locking posts 128, but may be provided on only one to all four sides without departing from the scope of the invention. Regardless of the number of snap-locks, the snap-together connection can be completed without tools or without the need for excessive strength. One embodiment provides for disassembly of the connection by mounting the snap-locks 130 on spring tabs 140, whereby depressing the snap-locks causes deflection of the spring tabs to allow the panel member to be slid off of the locking post 128. It should be noted that while the locking posts 128 and sockets 124 are illustrated as rectangular, other shapes may be utilized without departing from the scope of the invention so long as the cross-section of each locking post corresponds substantially to the cross-section of each receiving socket.

Figure 9:
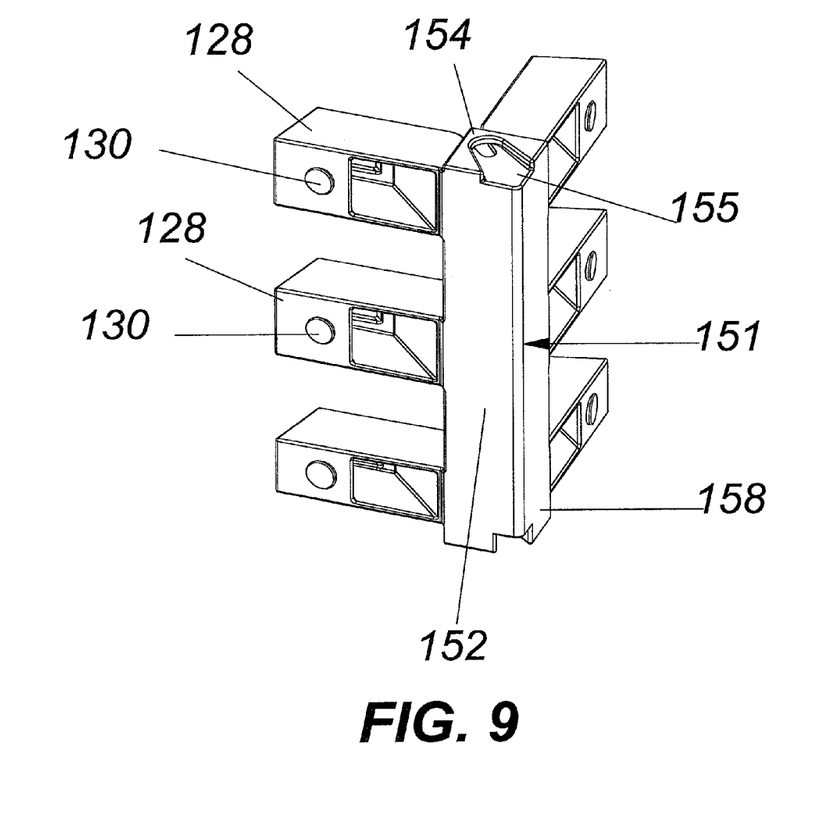
FIG. 9 is a front perspective view of one embodiment of a corner connector of the present invention.
Figure 10:
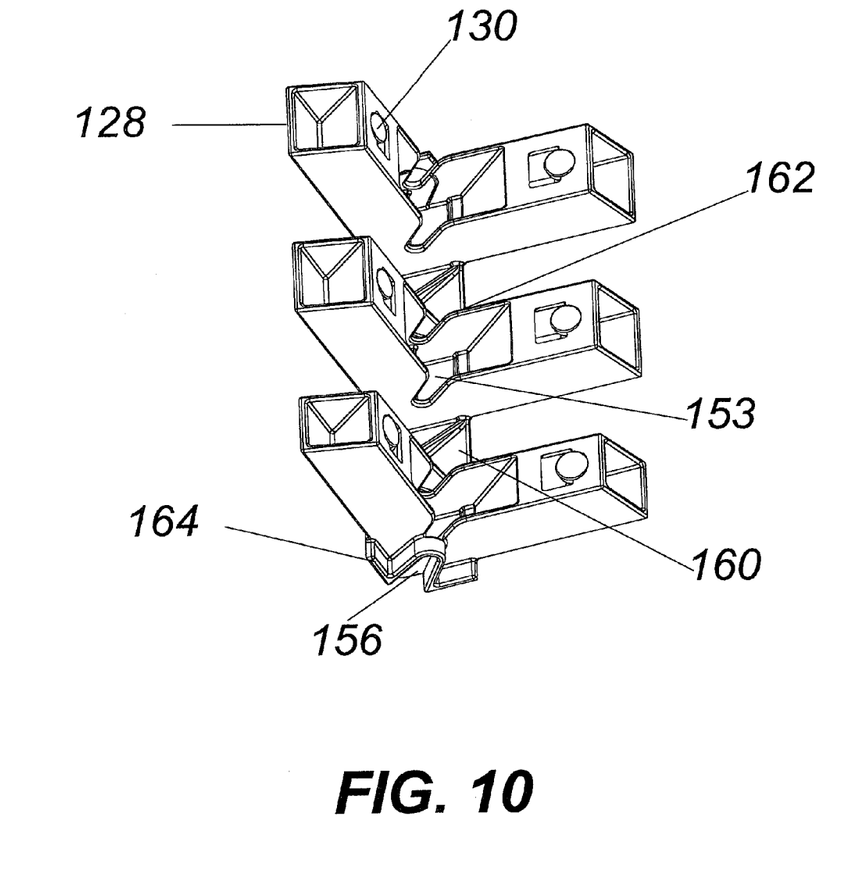
FIG. 10 is a rear perspective view of the corner connector illustrated in FIG. 9.
Figure 11:
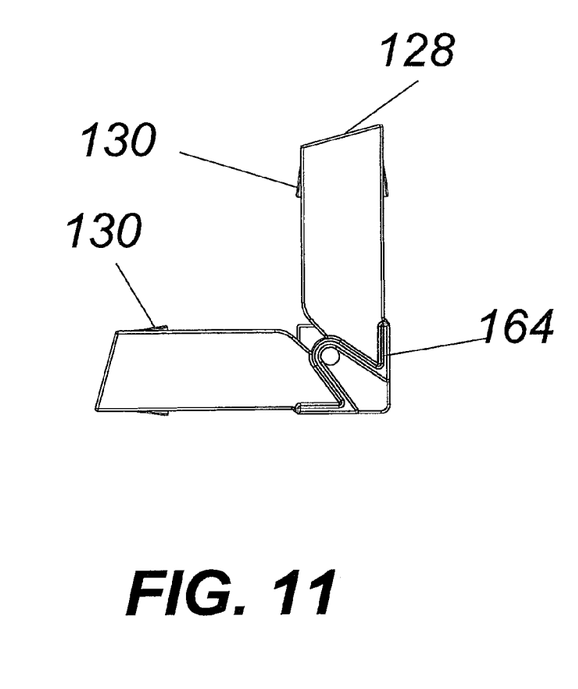
FIG. 11 is a top view of the corner connector illustrated in FIG. 9.

Referring to FIGS. 9-11, one embodiment of a corner connector is illustrated. The corner connector includes a central column 151 having intersecting sidewalls 152, a top wall 154, and a bottom wall 156. The sidewalls are oriented substantially perpendicular with respect to each other along the length thereof. Each intersecting sidewall has an exterior surface 158 and an interior surface 160, the interior surface helping further define the garden bed. The top surface 154 includes a recessed area 155 for accepting the head portion of a stake member 108. The bottom surface includes an outwardly extending key 164 sized and shaped to cooperate with the recessed portion 155 during staking of the panel members. Extending from the interior surface of each sidewall of the corner connector is a plurality of locking posts 128. The locking posts extend substantially perpendicular from the central column at substantially right angles with respect to each other. The intersections of the locking posts provide strengthening ribs 162 to the corner connector and also include a substantially U-shaped slot 153 for passage of a stake member 108. The locking posts are generally rectangular in shape and sized to slip into locking sockets 124 until snap-locks 130 engage apertures 126 in the side walls of the panel members to complete the connection (FIGS. 13-16). The snap-locks are preferably provided on two opposing sides of the locking posts but may be provided on only one to all four sides without departing from the scope of the invention. Regardless of the number of snap-locks, the snap-together connection can be completed without tools or without the need for excessive strength. One embodiment provides for disassembly of the connection by mounting the snap-locks 130 on spring tabs 140, whereby depressing the snap-locks causes deflection of the spring tabs to allow the panel member to be slid off of the locking post 128. It should be noted that while the locking posts 128 and sockets 124 are illustrated as rectangular, other shapes may be utilized without departing from the scope of the invention so long as the cross-section of each locking post corresponds substantially to the cross-section of each receiving socket.

Figure 13:
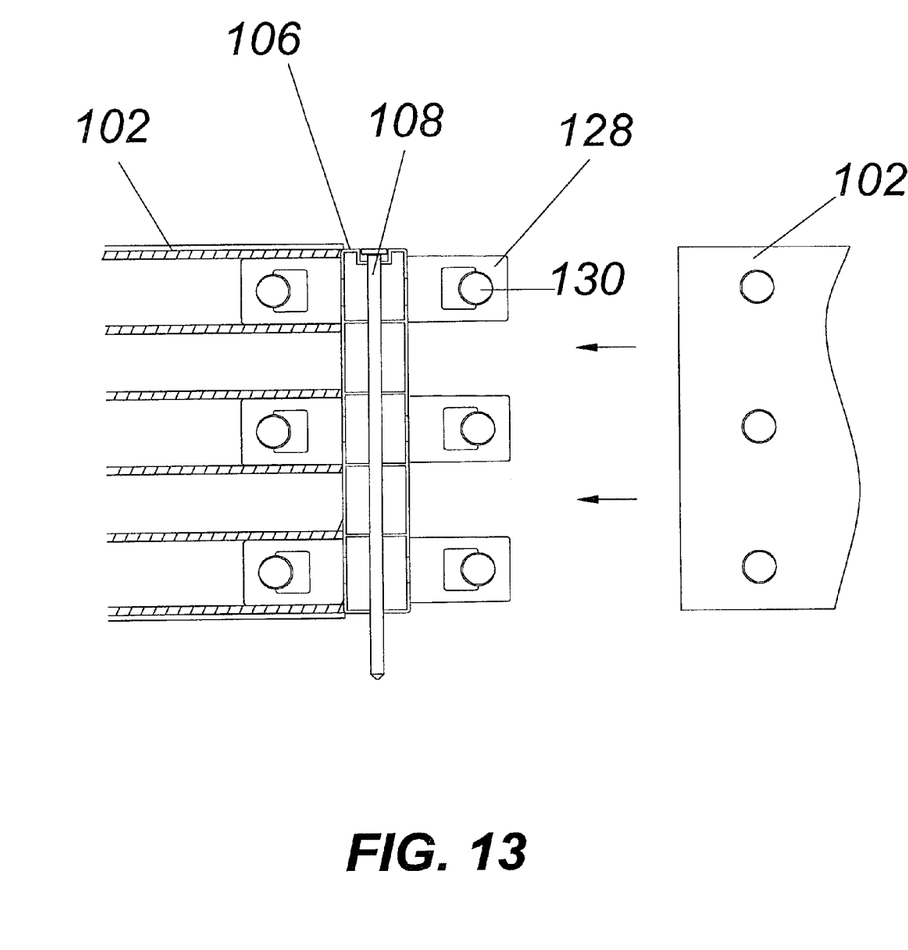
FIG. 13 is a partial side view, partially in section, illustrating assembly of a panel member to a connector member.
Figure 14:
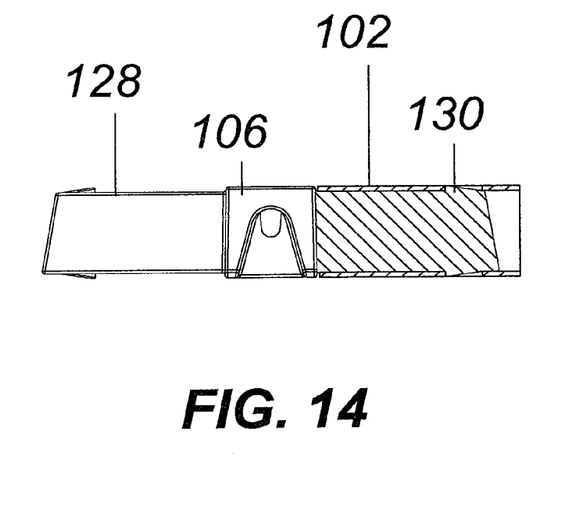
FIG. 14 is a top view illustrating the securing connection between the connector member and a panel member.
Figure 15:
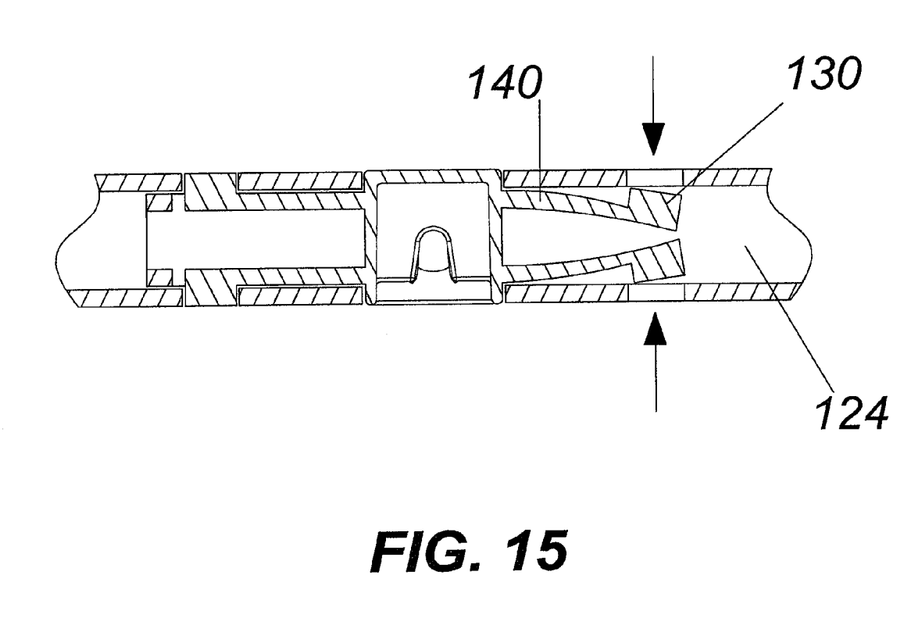
FIG. 15 is a partial section view illustrating disassembly of a panel member and a connector member.

Referring to FIGS. 13-15, various assembled connections between the connector members and the panel members are illustrated. FIG. 13 illustrates the snap-together assembly facilitated by the locking posts and sockets. FIG. 14 illustrates the panel member in place over the locking posts. FIG. 15 illustrates a connector having the snap-locks 130 formed integral to spring tabs 140. This arrangement facilitates disassembly of the raised garden bed.

Figure 12:
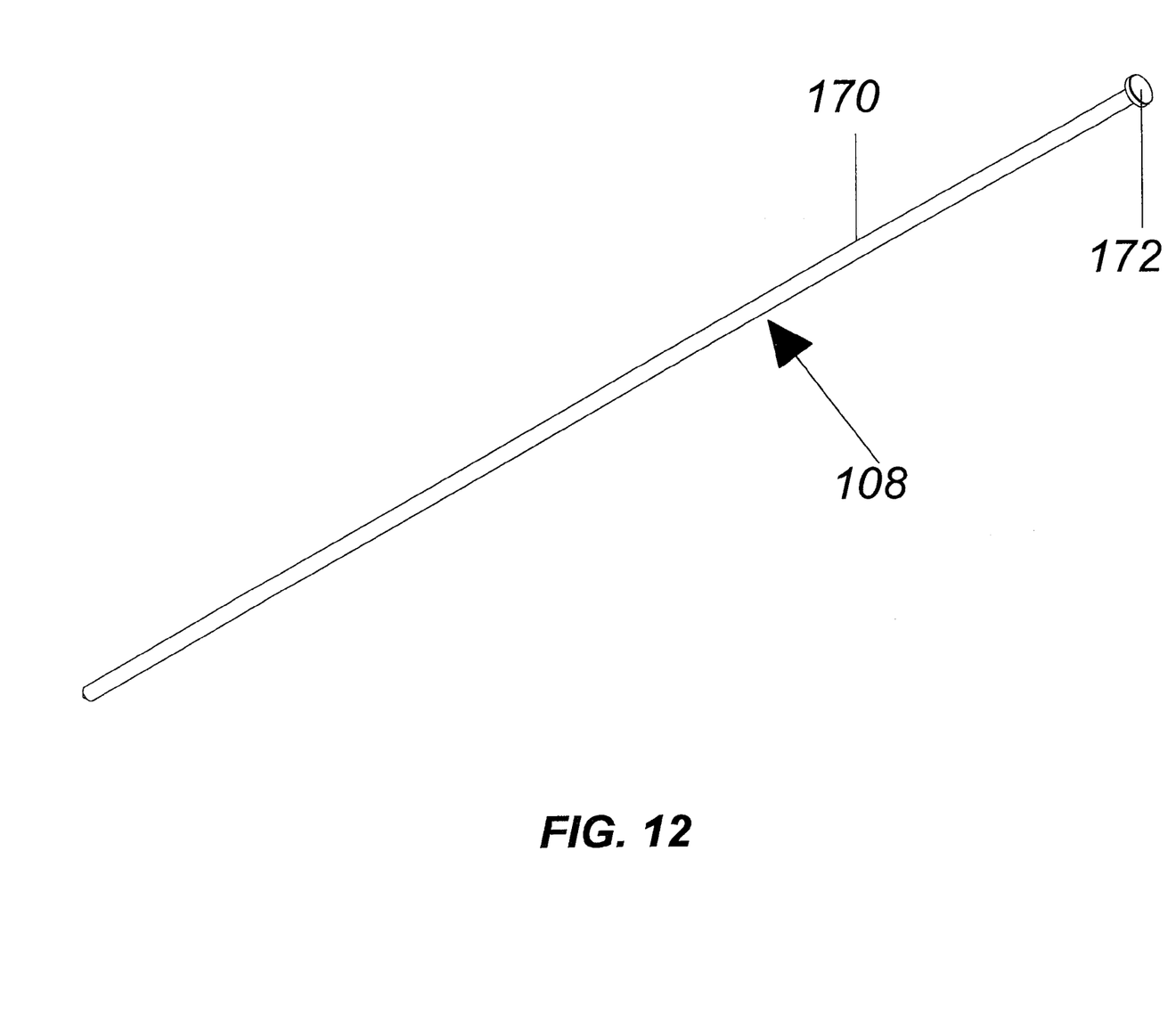
FIG. 12 is a perspective view of a stake member of the present invention.

Referring to FIG. 12, a stake member 108 is illustrated. The stake member generally includes a shank portion 170 and a head portion 172. The shank portion is preferably round in shape and includes a length sufficient to extend through a panel member or connector member and extend into the ground surface a sufficient distance to secure the raised garden bed in place. The head portion 172 is preferably round in shape and includes a thickness sufficient to withstand being driven into a ground surface. The stake may include a surface coating to prevent oxidation of the stake member. Suitable coatings may include, but should not be limited to, zinc, paint, polymers and suitable combinations thereof. It should be noted that while the head and shank are illustrated as round virtually any cross sectional shape suitable to withstand being driven into a ground surface will work without departing from the scope of the invention.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A raised garden bed kit comprising:
   a plurality of elongate panel members, each said panel member including a top wall, a bottom wall, and substantially parallel sidewalls each sidewall defining an interior surface and an exterior surface, a plurality of cross braces extending between the interior surfaces to provide strength and rigidity to said panel members as well as define generally rectangular shaped sockets for accepting said locking posts for connection to the connectors;
   a plurality of corner connectors, each said corner connector including a central column, at least two locking posts extending outwardly from adjacent sides of said central column at substantially right angles with respect to each other, each said locking post having a size and shape for insertion into one of said at least one sockets, each said locking post including at least one spring lock positioned on a spring tab, said spring tab constructed and arranged to allow deflection of said spring lock between a lock position and a disassembly position, said central column of each said corner connector including a stake aperture therethrough for passage of a stake member for securing said corner connector to a ground surface; whereby each of said corner connectors is constructed and arranged to connect two of said elongate panel members in a substantially perpendicular orientation with respect to each other by inserting one of said locking posts of a corner connector into a socket positioned in the distal end of each of two panel members, said top wall of each said panel member includes a protruding tongue extending substantially along the length thereof and said bottom wall of each said panel member has a corresponding groove extending substantially along the length thereof, whereby said tongue and said groove cooperate to allow aligned stacking of said panel members;

at least one linear connector, said at least one linear connector including a column portion having about the same thickness and height of said panel members, at least one locking post extending outwardly from opposite sides of said column portion so that said locking posts are substantially axially aligned, each said locking post having a size and shape for insertion into one of said at least one locking sockets, each said locking post including at least one spring lock positioned on a spring tab, said spring tab constructed and arranged to allow deflection of said spring lock between a lock position and a disassembly position, whereby said at least one linear connector is constructed and arranged to connect two of said panel members in axial alignment with respect to each other by inserting one of said locking posts of said at least one linear connector into a socket positioned in the distal end of each of two panel members;

a plurality of stake members, each said stake member including a shank portion and a head portion, said shank portion sized to pass through said corner connector stake aperture.

2. A raised garden bed comprising:

a plurality of elongate panel members, connected together with a plurality of corner connectors forming a perimeter barrier for containing soil to define a raised garden bed, each said panel member including a bottom wall, a substantially imperforate sidewall and opposite distal ends, said bottom wall supported by a ground surface, each said distal end including at least one socket therein, a plurality of corner connectors, each of said corner connectors connecting two of said elongate panel members in a substantially perpendicular orientation with respect to each other, each said corner connector including a central column, at least two locking posts extending outwardly from adjacent sides of said central column at substantially right angles with respect to each other, each said locking post including at least one spring lock positioned on a spring tab, said spring tab constructed and arranged to allow deflection of said spring lock between a lock position and a disassembly position, each said locking post inserted into one of said at least one sockets for interlocking cooperation, said central column of each said corner connector including a stake aperture therethrough for passage of a stake member for securing said corner connector to said ground surface, said top wall of each said panel member includes a protruding tongue extending substantially along the length thereof and said bottom wall of each said panel member has a corresponding groove extending substantially along the length thereof, whereby said tongue and said groove cooperate to allowing aligned stacking of said panel members, at least one linear connector, said at least one linear connector including a column portion having about the same thickness and height of said panel members, at least one locking post extending outwardly from opposite sides of said column portion so that said locking posts are substantially axially aligned, each said locking post having a size and shape for insertion into one of said at least one locking sockets, each said locking post including at least one spring lock positioned on a spring tab, said spring tab constructed and arranged to allow deflection of said spring lock between a lock position and a disassembly position, whereby said at least one linear connector is constructed and arranged to connect two of said panel members in axial alignment with respect to each other by inserting one of said locking posts of said at least one linear connector into a socket positioned in the distal end of each of two panel members.

* * * * *